B. V. B. DIXON.
CORK-EXTRACTOR.

No. 173,396. Patented Feb. 15, 1876.

Witnesses:

Inventor:
Brandt V. B. Dixon
by
Mason Fenwick & Lawrence
atty.

UNITED STATES PATENT OFFICE.

BRANDT V. B. DIXON, OF ST. LOUIS, MISSOURI.

IMPROVEMENT IN CORK-EXTRACTORS.

Specification forming part of Letters Patent No. 173,396, dated February 15, 1876; application filed July 14, 1875.

*To all whom it may concern:*

Be it known that I, BRANDT V. B. DIXON, of St. Louis, county of St. Louis and State of Missouri, have invented a new and Improved Cork-Extractor; and I do hereby declare that the following is a full, clear, and exact description thereof, reference being had to the accompanying drawings, making part of this specification, in which—

Figure 1:
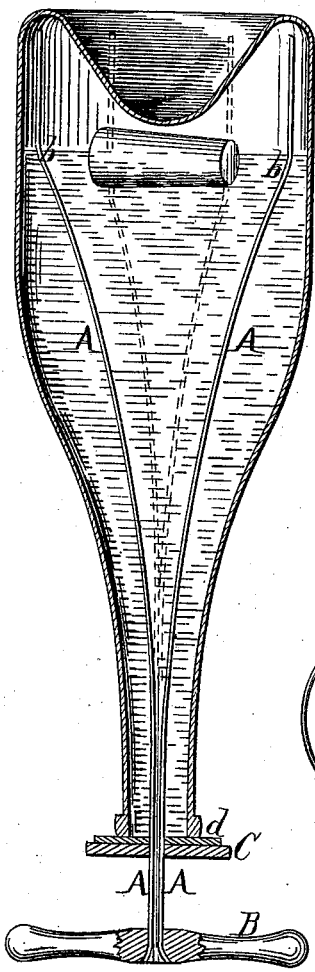
Figure 2:
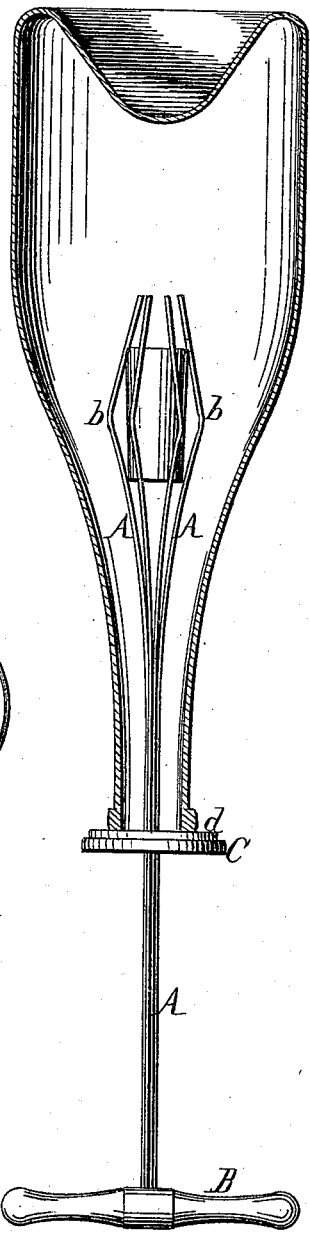
Figure 3:
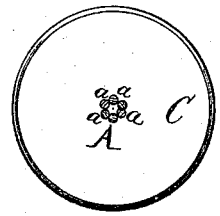
Figure 4:
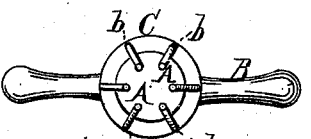

Figure 1 is a vertical central section of my implement inserted into a bottle, and as expanded therein. The bottle is shown with a cork and a fluid substance in it. In this view the bottle is shown inverted simply to illustrate how the disk will prevent fluid running out. The filled bottle will generally rest on its bottom when a cork is to be taken out of it. Fig. 2 is a side elevation of the implement, and a section of a bottle. In this view the implement is shown contracted upon the cork, and ready to withdraw the cork from the bottle. Fig. 3 is a horizontal section of the implement. Fig. 4 is a bottom view of the implement, showing a cork as confined by the wires, after being withdrawn.

The nature of my invention consists in a series of bent spring-wires, brought together at their upper ends and fastened in a handle, said wires being passed through a disk having a central corrugated orifice through which all the wires are passed, and by which they are held in position and caused to approach each other at their lower ends when they are drawn by their handle through the disk.

By my invention the implement is provided with a means which admits of the mouth of the bottle being used as a fulcrum for the implement to bear against when the wires are to be expanded within the bottle for the purpose of taking hold of a cork, and when the wires are being contracted upon the cork, the said means also serving to prevent fluid flowing from the bottle while the bottle is canted or inverted, or partly inverted, and the spring-wires are being contracted upon the cork to be withdrawn.

My plan of construction greatly simplifies the cork-extractors heretofore devised, and also avoids much of the inconvenience experienced in manipulating the same.

A A designate the wires, any suitable number of which may be used. Six answer well for the purpose. B is the handle in which they are fastened, and C the fulcrum-disk through which the wires are passed. The central passage through this disk is fluted or corrugated, as at $a$ $a$, so that each of the wires will be held in its proper place while the implement is being used. The wires are bent, as indicated at $b$, and also curved inwardly between this bend and the washer, so as to have the requisite spring action, and also a form which will cause them to spread far apart, as in Fig. 1, and also to come close together above and below the cork when compressed upon the cork in the manner shown in Fig. 2. The receptacle for the cork is similar to two cones with their bases adjoining, and this form prevents the cork from having a movement in an endwise direction when confined as in Fig. 2.

The disk C is either circular or rectangular in form, and of an area greater than the mouth of the bottle. Its upper surface, if found necessary and desirable, may be packed with rubber or suitable material $d$, for forming a fluid-tight joint.

The implement may be used for withdrawing corks from the inside of either empty or filled bottles, just as circumstances require. The lower ends of the wires may be made with barbs or hooks if found necessary.

What I claim is—

A cork-extractor formed of wires separated and bent at their lower ends, and bound together at their upper ends by a handle and a fulcrum-disk, through which disk the wires are passed, and by which they are compressed upon the cork to be extracted, substantially as and for the purposes described.

BRANDT V. B. DIXON.

Witnesses:
W. D. VAN BLARCOM,
PAUL ROBYN.